(12) United States Patent
Cheong

(10) Patent No.: US 11,003,270 B2
(45) Date of Patent: May 11, 2021

(54) TOUCH SCREEN PANEL

(71) Applicant: ELECTRONICS AND TELECOMMUNICATIONS RESEARCH INSTITUTE, Daejeon (KR)

(72) Inventor: Woo-Seok Cheong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/789,402

(22) Filed: Feb. 12, 2020

(65) Prior Publication Data

US 2020/0257393 A1 Aug. 13, 2020

(30) Foreign Application Priority Data

Feb. 13, 2019 (KR) .......................... 10-2019-0016917
Jul. 4, 2019 (KR) .......................... 10-2019-0080657

(51) Int. Cl.
*G06F 3/041* (2006.01)
(52) U.S. Cl.
CPC ................................. *G06F 3/0412* (2013.01)
(58) Field of Classification Search
CPC .................................................... G06F 3/0412
See application file for complete search history.

(56) References Cited

U.S. PATENT DOCUMENTS

| 9,285,935 | B2 | 3/2016 | Yun et al. | |
|---|---|---|---|---|
| 9,298,290 | B2 | 3/2016 | Shin et al. | |
| 9,529,472 | B2 * | 12/2016 | Gu | G06F 3/03542 |
| 2009/0237365 | A1 * | 9/2009 | Choi | G02F 1/13338 345/173 |
| 2010/0007625 | A1 * | 1/2010 | Jiang | G06F 3/045 345/173 |
| 2011/0050631 | A1 | 3/2011 | Kwon et al. | |
| 2011/0134056 | A1 * | 6/2011 | Kim | G06F 3/0446 345/173 |
| 2013/0038338 | A1 * | 2/2013 | Lipasti | G06F 3/0445 324/658 |
| 2013/0266724 | A1 | 10/2013 | Cheong | |
| 2015/0002458 | A1 * | 1/2015 | Lee | G06F 3/0418 345/174 |
| 2015/0042604 | A1 * | 2/2015 | Lu | G06F 3/046 345/174 |
| 2015/0042612 | A1 * | 2/2015 | Lee | G06F 3/0412 345/174 |

(Continued)

FOREIGN PATENT DOCUMENTS

| KR | 1020090098947 A | 9/2009 |
|---|---|---|
| KR | 1020120119183 A | 10/2012 |

(Continued)

*Primary Examiner* — Sejoon Ahn
(74) *Attorney, Agent, or Firm* — Rabin & Berdo, P.C.

(57) ABSTRACT

According to an embodiment of the inventive concept, a touch screen panel includes a substrate, touch cells disposed on the substrate and including a driving electrode pattern and a sensing electrode pattern, driving lines and sensing lines connected to the touch cells, and bonding pads connected to the driving lines and the sensing lines. Here, the driving electrode pattern and the sensing electrode pattern are provided by stacking a lower oxide layer, an intermediate metal layer, and an upper oxide layer.

15 Claims, 11 Drawing Sheets

(56) References Cited

U.S. PATENT DOCUMENTS

| | | | |
|---|---|---|---|
| 2015/0185940 A1* | 7/2015 | Han | G06F 3/0443 |
| | | | 345/174 |
| 2015/0227172 A1* | 8/2015 | Namkung | H01L 27/3267 |
| | | | 345/173 |
| 2019/0043390 A1* | 2/2019 | Wang | H05K 5/0017 |
| 2019/0058014 A1* | 2/2019 | Park | H01L 27/323 |

FOREIGN PATENT DOCUMENTS

| KR | 1020130094131 A | 8/2013 |
|---|---|---|
| KR | 1020140040512 A | 4/2014 |
| KR | 1020140040514 A | 4/2014 |
| KR | 1020140049918 A | 4/2014 |
| KR | 1020140051023 A | 4/2014 |
| KR | 1020140085989 A | 7/2014 |
| KR | 1020140085990 A | 7/2014 |
| KR | 101433052 B1 | 8/2014 |
| KR | 101607147 B1 | 3/2016 |

\* cited by examiner

TOUCH SCREEN PANEL

CROSS-REFERENCE TO RELATED APPLICATIONS

This U.S. non-provisional patent application claims priority under 35 U.S.C. § 119 of Korean Patent Application Nos. 10-2019-0016917, filed on Feb. 13, 2019, and 10-2019-0080657, filed on Jul. 4, 2019, the entire contents of which are hereby incorporated by reference.

BACKGROUND

The present disclosure herein relates to a touch screen panel, and more particularly, to a touch screen panel including a single electrode layer.

In recent years, as electronic devices such as computers and portable mobile communication terminals are generalized, a touch screen has been widely used as a unit for inputting data. The touch screen is classified into a resistance type, a capacitance type, an ultrasonic type, and an ultraviolet type.

The resistance type touch screen is a device for generating an electrical signal while transparent electrodes of upper and lower substrates contact each other when a finger or a pen touches a substrate, and then inputting data by recognizing a position from the generated electrical signal. The resistance type touch screen is inexpensive and has a high transmittance and a multi-touch function. Also, because of a fast response speed, the resistance type touch screen has an advantage in miniaturization. Thus, the resistance type touch screen is mainly applied to PDA, PMP, navigation units, and headsets.

The capacitance type touch screen uses a feature of providing a predetermined capacitance in an insulation layer by a static electricity generated from a finger when the finger touches a substrate including a transparent electrode. A signal is transmitted through a portion in which the capacitance is generated, and a position is recognized by calculating a magnitude of the signal. The capacitance type touch screen has a multi-touch function and a high transmittance. Thus, the capacitance type touch screen may be applied to a display having a large area and a small thickness.

The ultrasonic type (SAW) touch screen uses a technology of detecting a reduced magnitude of a wave when the emitted ultrasonic wave meets an obstacle. The ultrasonic type touch screen has a high transmittance, accuracy, and visibility and is used for an automatic teller machine installed at the outside. However, a sensor of the ultrasonic type touch screen is easily contaminated by liquid.

The ultraviolet type (IR) touch screen uses a feature of ultraviolet rays that are blocked when an obstacle exists due to straightness. The ultraviolet type touch screen may not require an indium tin oxide (ITO) film or a glass substrate at a front surface of a display and be realized using only one piece of glass to have the best transmittance.

SUMMARY

The present disclosure provides a touch screen panel including a single electrode layer.

The present disclosure also provides a touch screen panel using a hybrid electrode.

The present disclosure also provides a touch screen panel having a touch cell structure capable of maximizing a parasitic capacitance.

The present disclosure also provides a touch screen panel capable of having a large area by dividing bonding pads into a plurality of rows.

The object of the present invention is not limited to the aforesaid, but other objects not described herein will be clearly understood by those skilled in the art from descriptions below.

An embodiment of the inventive concept provides a touch screen panel including: a substrate; touch cells disposed on the substrate and including a driving electrode pattern and a sensing electrode pattern; driving lines and sensing lines connected to the touch cells; and bonding pads connected to the driving lines and the sensing lines. Here, the driving electrode pattern and the sensing electrode pattern are provided by stacking a lower oxide layer, an intermediate metal layer, and an upper oxide layer.

In an embodiment, each of the driving electrode pattern and the sensing electrode pattern may include portions extending in a first direction and portions extending in a second direction perpendicular to the first direction.

In an embodiment, the sensing electrode pattern may surround the driving electrode pattern while being spaced apart from the driving electrode pattern.

In an embodiment, the driving electrode pattern may include: a first portion being provided at a center of each of the touch cells and extending in the first direction; and second portions extending from the first portion in a direction parallel to the second direction and a direction opposite to the second direction.

In an embodiment, the driving electrode pattern may include: a first portion being provided at a center of each of the touch cells and extending in the first direction; second portions extending from the first portion in a direction parallel to the second direction and a direction opposite to the second direction; third portions extending in the direction parallel to the second direction and the direction opposite to the second direction while being spaced apart from the first portion; and fourth portions configured to connect the second portions and the third portions and extending in the first direction.

In an embodiment, the driving electrode pattern may include: first portions extending in the first direction; and second portions extending in the second direction. Here, the first portions and the second portions may be repeatedly provided to have a vortex shape.

In an embodiment, the touch cells may be arranged in a matrix form, a half of the touch cells, which corresponds to one row, may be connected to the driving lines at a left side thereof, and a half of the touch cells, which corresponds to one row, may be connected to the driving lines at a right side thereof.

In an embodiment, the touch cells may be arranged in a matrix form, and the touch cells corresponding to one row may be connected to the driving lines alternately at left and right sides thereof.

In an embodiment, a bezel area may be defined at an edge of a matrix form of the touch cells, and the driving lines and the sensing lines may be connected to the bonding pads in the bezel area.

In an embodiment, the touch screen panel may further include ground lines disposed between the driving lines and the sensing lines in the bezel area.

In an embodiment, the bonding pads may be divided into two rows in a misaligned manner in the bezel area.

In an embodiment, the substrate may be made of at least one of tempered glass, reinforced plastic, and polyethylene terphthalate (PET).

In an embodiment, the lower oxide layer may be made of at least one selected from the group consisting of ZnO, ZITO(ZnO+$In_2O_3$+$SnO_2$), $SiO_2$, ZTO, $TiO_2$, AZO(Al-doped ZnO), GZO(Ga-doped ZnO), SiNx, ITO, IZO($In_2O_3$+ZnO), and a compound thereof, the intermediate metal layer may be made of Ag or an Ag alloy, and the upper oxide layer may be made of at least one of TIO, IZTO, IZO, AZO, and GZO.

In an embodiment, the touch screen panel may further include: a window provided on a bottom surface of the substrate through a first optical adhesive layer; and a display panel provided on the substrate and the touch cells through a second optical adhesive layer.

In an embodiment, the window may be made of at least one of tempered glass, reinforced plastic, and polyethylene terphthalate (PET).

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
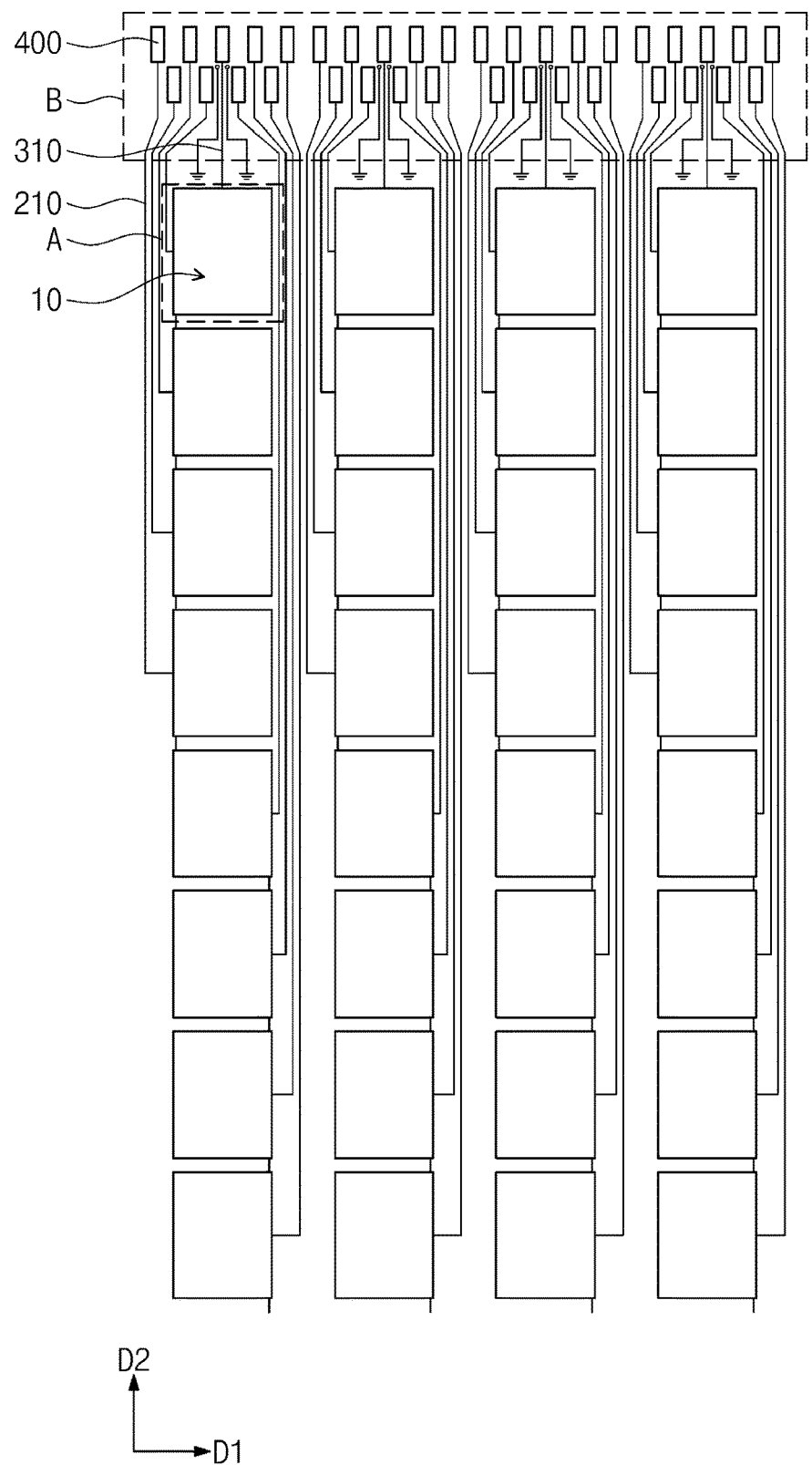
FIGS. 1A and 2A are plan views illustrating a touch screen panel according to embodiments of the inventive concept.

Exemplary embodiments of the present invention will be described with reference to the accompanying drawings so as to sufficiently understand constitutions and effects of the present invention.

The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Also, in the figures, the dimensions of layers and regions are exaggerated for clarity of illustration.

In the following description, the technical terms are used only for explaining a specific exemplary embodiment while not limiting the present disclosure. Unless terms used in embodiments of the present invention are differently defined, the terms may be construed as meanings that are commonly known to a person skilled in the art.

The terms of a singular form may include plural forms unless referred to the contrary. The meaning of 'comprises' and/or 'comprising' specifies a component, a step, an operation and/or an element does not exclude other components, steps, operations and/or elements.

In the specification, it will be understood that when a layer (or film) is referred to as being 'on' another layer or substrate, it can be directly on the other layer or substrate, or intervening layers may also be present.

It will be understood that although the terms first and second are used herein to describe various elements, these elements should not be limited by these terms. These terms are used only to discriminate one region or layer from another region or layer. Therefore, a portion referred to as a first portion in one embodiment can be referred to as a second portion in another embodiment. An embodiment described and exemplified herein includes a complementary embodiment thereof. Like reference numerals refer to like elements throughout.

Hereinafter, embodiments of a touch screen panel according to an embodiment of the inventive concept will be described in detail with reference to FIGS. 1A to 9.

Figure 1B:
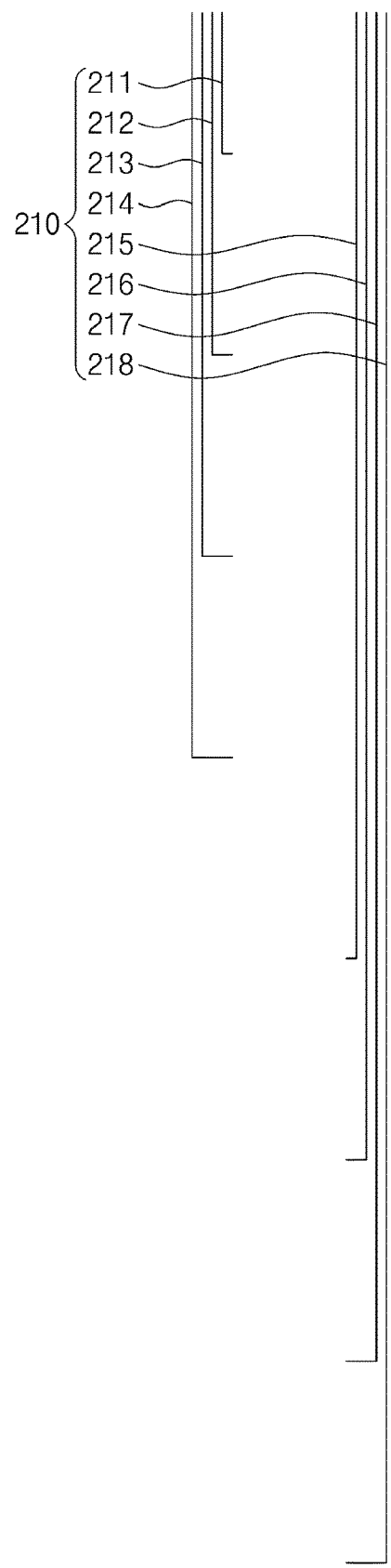
FIGS. 1B and 2B are plan views for specifically explaining a method for designing driving lines of the touch screen panel according to embodiments of the inventive concept.
Figure 2A:
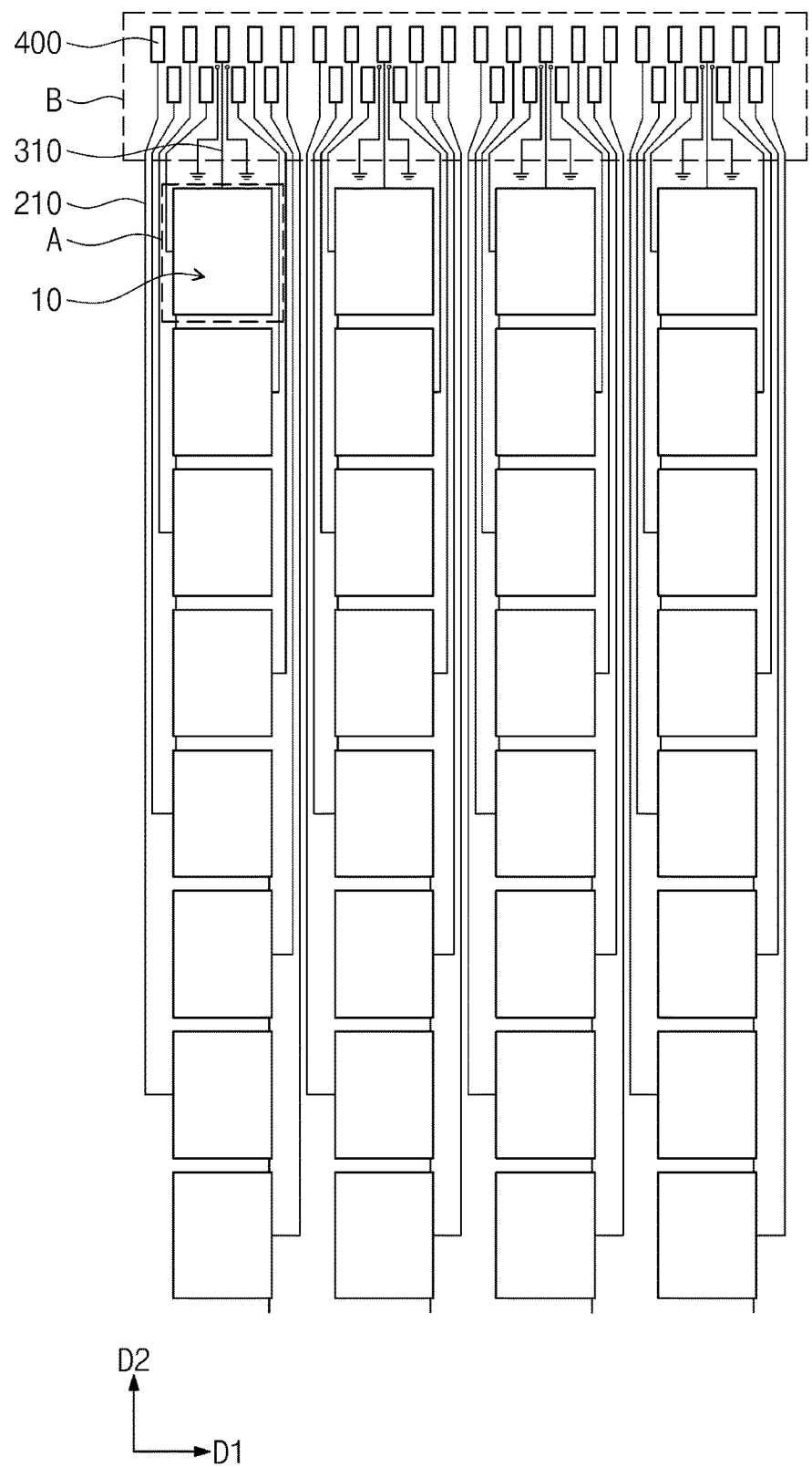
Figure 2B:
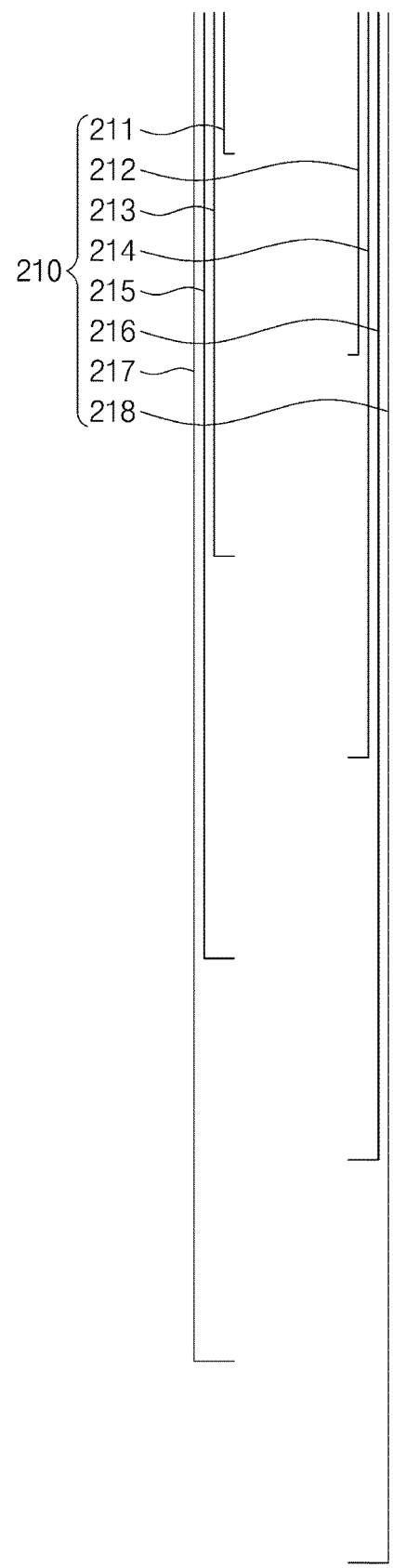

FIGS. 1A and 2A are plan views illustrating a touch screen panel according to embodiments of the inventive concept. FIGS. 1B and 2B are plan views for specifically explaining a method for designing driving lines of the touch screen panel according to embodiments of the inventive concept.

Referring to FIGS. 1A and 2A, the touch screen panel according to embodiments of the inventive concept may include a plurality of cell areas A and a bezel area B. Touch cells 10 may be provided on the cell areas A. Although each of the touch cells 10 may have a rectangular shape, the embodiment of the inventive concept is not limited thereto. For example, each of the touch cells 10 may have various shapes. A plurality of touch cells 10 may be provided in a matrix form. Although the matrix form having eight rows and four columns with 32 touch cells is illustrated in FIGS. 1A and 2A, the embodiments of the inventive concept is not limited thereto. For example, the number of rows and columns and the number of the touch cells 10 may increase or decrease. The bezel area B may be provided at an edge of the matrix form including the touch cells 10. For example, the bezel area B may be provided at an edge in a second direction D2 from the matrix form including the touch cells 10. The bezel area B may include bonding pads 400.

Also, the touch screen panel may include a plurality of driving lines 210 and a plurality of sensing lines 310. The driving lines 210 and the sensing lines 310 may be spaced apart from each other not to overlap or meet each other. Each of the driving lines 210 may be electrically connected to a left edge or a right edge of each of the touch cells 10. Each of the sensing lines 310 may be electrically connected to an upper edge or a lower edge of each of the touch cells 10. In FIGS. 1A and 2A, a horizontal direction may be parallel to a first direction D1, and a vertical direction may be parallel to the second direction D2. The driving lines 210 directly connected to the touch cells 10 may extend by a predetermined length in a direction parallel to the first direction D1 or a direction opposite to the first direction D1. Thereafter, the driving lines 210 may extend in the second direction D2 to reach the bezel area B. The sensing lines 310 directly connected to the touch cells 10 may extend in the second direction D2. The driving lines 210 and the sensing lines 310 may be electrically connected to the bonding pads 400 in the bezel area B. The driving lines 210 may extend while spreading at different angles in a direction inclined to the second direction D2 in the bezel area B. A space for arranging the bonding pads 400 may be sufficiently secured because of the spreading form of the driving lines 210.

Referring to FIG. 1B, the driving lines 210 may be provided on the basis of a design method according to an embodiment of the inventive concept. The driving lines 210 connected to the touch cells 10 corresponding to one column may be provided. Eight driving lines 210 from a driving line 211 connected to the touch cell 10, which is closest to the bonding pads 400, to a driving line 218 connected to the touch cell 10, which is farthest from the bonding pads 400, may be provided. However, this is merely an example. The embodiment of the inventive concept is not limited thereto. For example, the number of the driving lines 210 may be varied as the number of the touch cells 10 are varied. Four driving lines 211 to 214 that are consecutive from a driving line 211 connected to the touch cell 10, which is closest to the bonding pads 400, may be provided at a left side of the touch cells 10. Also, the rest four driving lines 215 to 218 may be provided at a right side of the touch cells 10. With respect to the touch cells 10, a half of touch cells 10 close to the bonding pads 400 may be connected to the driving lines 210 at the left side thereof, and a half of touch cells 10 far from the bonding pads 400 may be connected to the driving lines 210 at the right side thereof. Unlike as illustrated, although the number of the touch cells 10 corresponding to one row is varied, the touch cells 10 may be divided into halves and connected to the driving lines 210 at the left or right side thereof in the same manner.

Referring to FIG. 2B, the driving lines 210 may be provided on the basis of a design method according to another embodiment of the inventive concept. Features that are substantially the same as those described with reference to FIG. 1B will not be described again for convenience of description. The odd-numbered four driving lines 211, 213, 215, and 217 from the driving line 211 connected to the touch cell 10 closest to the bonding pads 400 may be provided at the left side of the touch cells 10. Also, the even-numbered four driving lines 212, 214, 216, and 218 may be provided at the right side of the touch cells 10. With respect to the touch cells 10, the odd-numbered touch cells 10 may be connected to the driving lines 210 at the left side thereof, and the even-numbered touch cells 10 may be connected to the driving lines 210 at the right side thereof from the closest touch cell 10 to the bonding pads 400. Unlike as illustrated, although the number of the touch cells 10 corresponding to one row is varied, the touch cells 10 may be divided into halves and connected to the driving lines 210 at the left or right side thereof in the same manner.

As illustrated in FIGS. 1B and 2B, when the bonding pads 400 and the driving lines 210 are connected by dividing the touch cells 10 corresponding to one row into halves and arranging the driving lines 210 at the left and right sides of the touch cells 10, a space may be efficiently used.

Figure 3:
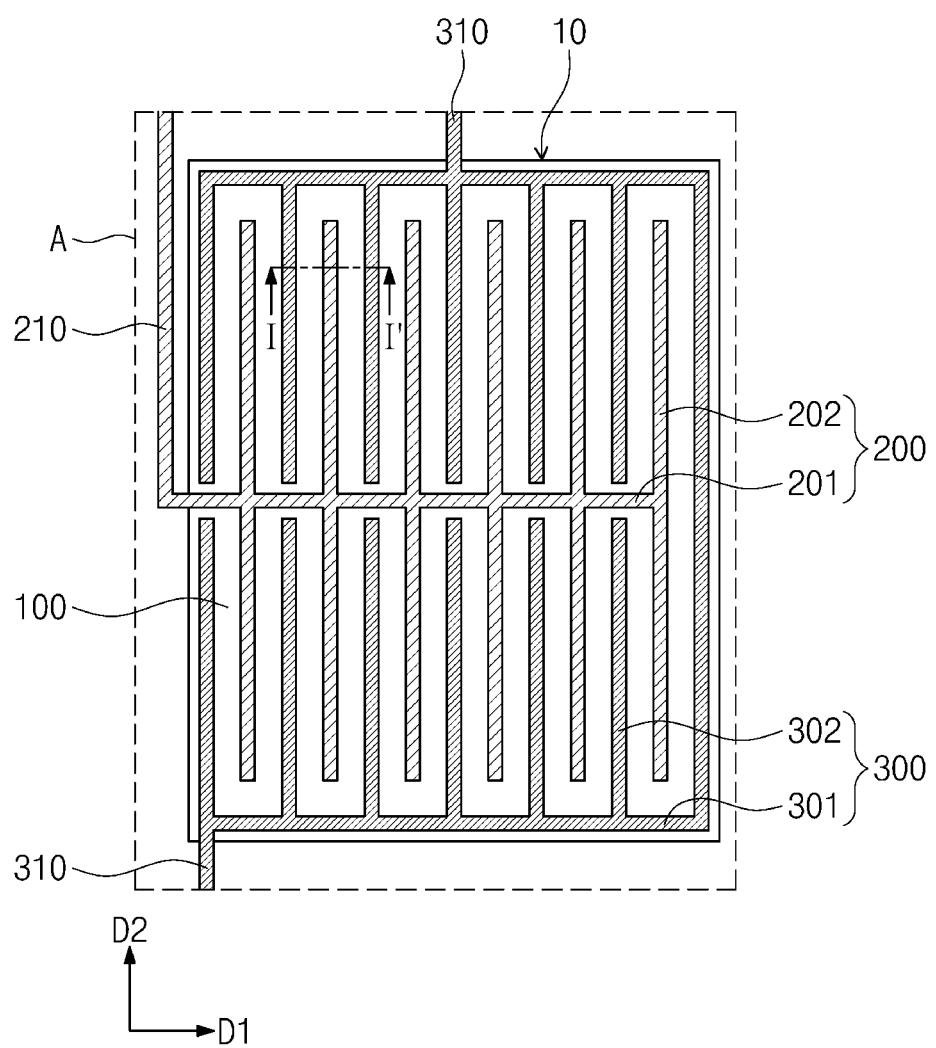
FIGS. 3 to 5 are plan views illustrating touch cells according to embodiments of the inventive concept and enlarging a portion A of one of FIGS. 1A and 2A.
Figure 4:
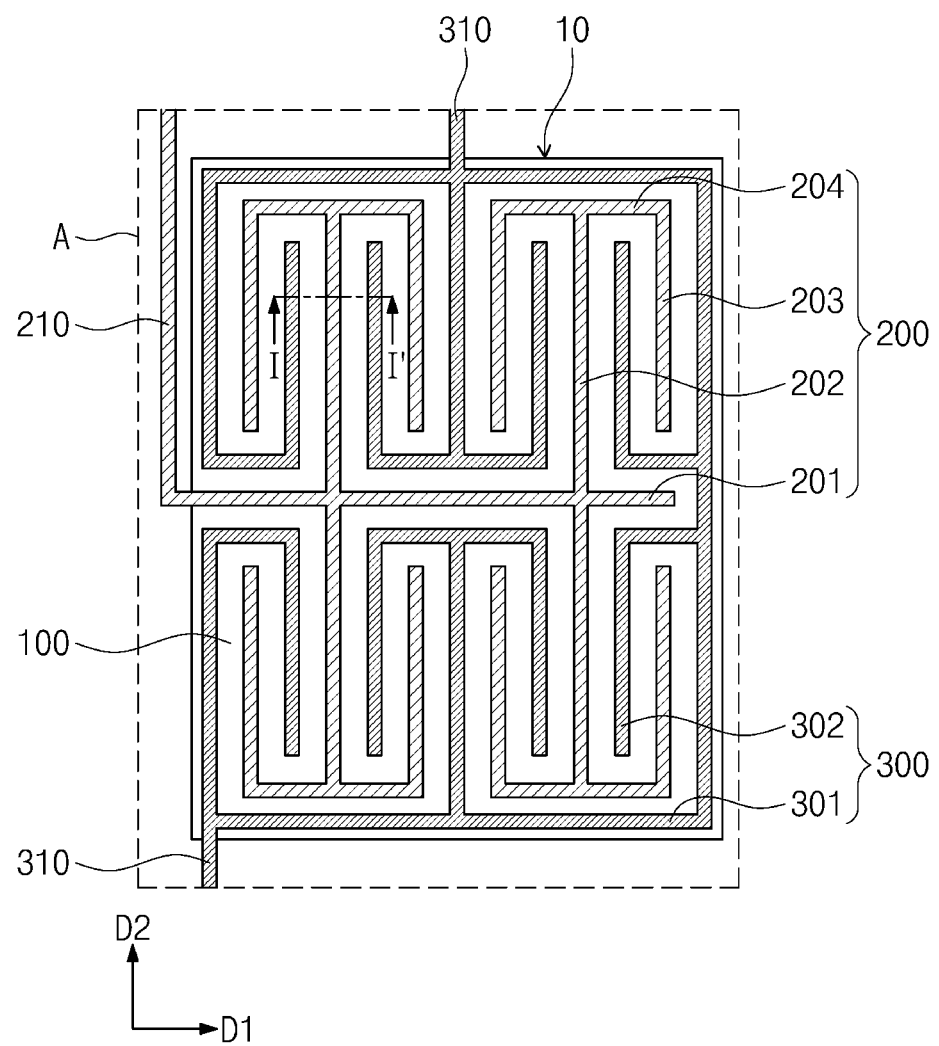
Figure 5:
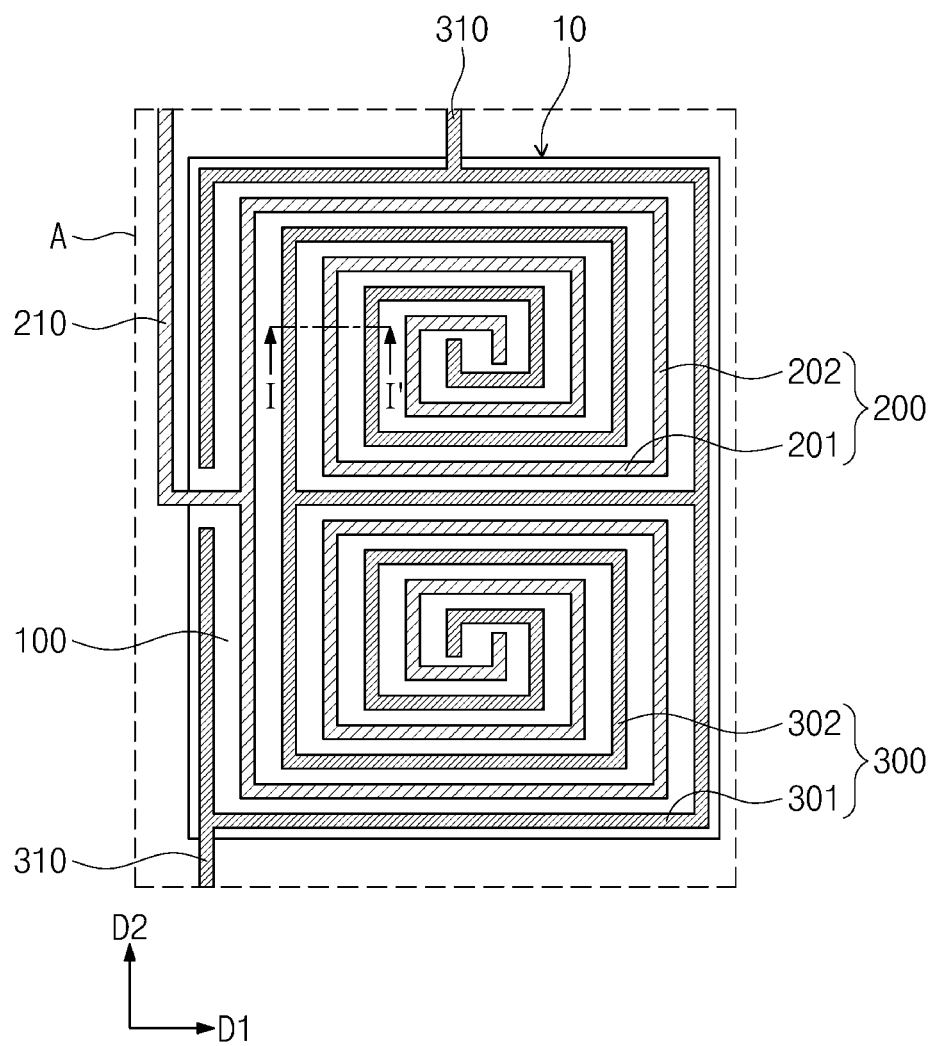

FIGS. 3 to 5 are plan views illustrating touch cells according to embodiments of the inventive concept and enlarging a portion A of any one of FIGS. 1A and 2A. Hereinafter, a single touch cell will be described with reference to FIGS. 3 to 5.

Referring to FIGS. 3, 4, and 5, each of the touch cells 10 may include a driving electrode pattern 200 and a sensing electrode pattern 300, which are provided on a substrate 100. Each of the driving electrode pattern 200 and the sensing electrode pattern 300 may include portions extending in the first direction D1 and portions extending in the second direction D2. The first direction D1 and the second direction D2 may be perpendicular to each other. Each of the driving electrode pattern 200 and the sensing electrode pattern 300 may include a hybrid electrode. Hereinafter, the hybrid electrode represents an electrode in which a metal layer is provided between a pair of oxide layers. The hybrid electrode may be deposited on the substrate 100, and then the driving electrode pattern 200 and the sensing electrode pattern 300 may be provided through a patterning process. An etched area through the patterning process may have a width of about 10 µm to about 40 µm. A dummy pattern (not shown) may be provided on the etched area through the patterning process.

Referring to FIG. 3, the driving electrode pattern 200 and the sensing electrode pattern 300 may be provided on the basis of the design method according to an embodiment of the inventive concept. The driving electrode pattern 200 may include a first portion 201 extending in the first direction D1 and second portions 202 each extending in the second direction D2. The first portion 201 of the driving electrode pattern 200 may be provided at a center of the touch cell 10. The first portion 201 of the driving electrode pattern 200 may extend in the first direction D1. Also, the second portions 202 of the driving electrode pattern 200 may extend from the first portion 201 of the driving electrode pattern 200 in a direction parallel to the second direction D2 and a direction opposite to the second direction D2. The first portion 201 of the driving electrode pattern 200 may be electrically connected to any one of the driving lines 210 at a left or right edge.

The sensing electrode pattern 300 may include first portions 301 each extending in the first direction D1 and second portions 302 each extending in the second direction D2. The first portions 301 of the sensing electrode pattern 300 may extend from the upper and lower edge of the touch cell 10 in the first direction D1. The second portions 302 of the sensing electrode pattern 300 may extend from the first portions 301 of the sensing electrode pattern 300 in a direction parallel to the second direction D2 and a direction opposite to the second direction D2. The sensing electrode pattern 300 may be spaced a predetermined distance while surrounding the driving electrode pattern 200. The first portions 301 of the sensing electrode pattern 300 may be spaced apart from the second portions 202 of the driving electrode pattern 200. The second portions 302 of the sensing electrode pattern 300 may be spaced apart from the first portion 201 and the second portions 202 of the driving electrode pattern 200. Each of the second portions 302 of the sensing electrode pattern 300 may be provided between the second portions 202 of the driving electrode pattern 200. The first portions 301 of the sensing electrode pattern 300 may be electrically connected to the sensing lines 310 at upper and lower edges of the touch cell 10, respectively.

Referring to FIG. 4, a driving electrode pattern 200 and a sensing electrode pattern 300 may be provided on the basis of a design method according to another embodiment of the inventive concept. The driving electrode pattern 200 may include a first portion 201 and fourth portions 204, which each extend in the first direction D1. Also, the driving electrode pattern 200 may include second portions 202 and third portions 203, which each extend in the second direction D2. The first portion 201 of the driving electrode pattern 200 may be provided at a center of the touch cell 10. The first portion 201 of the driving electrode pattern 200 may extend in the first direction D1. Also, the second portions 202 of the driving electrode pattern 200 may extend from the first portion 201 of the driving electrode pattern 200 in a direction parallel to the second direction D2 and a direction opposite to the second direction D2. Also, the third portions 203 of the driving electrode pattern 200 may be spaced apart from the first portion 201 and the second portions 202 of the driving electrode pattern 200 and extend in the direction parallel to the second direction and the direction opposite to the second direction D2. Also, the fourth portions 204 of the driving electrode pattern 200 may extend in the first direction D1 to connect the second portions 202 and the third portions 203 of the driving electrode pattern 200 at the upper and lower edges of the touch cell 10. The first portion 201 of the driving electrode pattern 200 may be electrically connected to any one of the driving lines 210 at the left or right edge.

The sensing electrode pattern 300 may include first portions 301 each extending in the first direction D1 and second portions 302 each extending in the second direction D2. A portion of the first portions 301 of the sensing electrode pattern 300 may extend in the first direction D1 at the upper and lower edges of the touch cell 10. Also, a portion of the first portions 301 of the sensing electrode pattern 300 may extend in the first direction D1 between the first portion 201 and the third portions 203 of the driving electrode pattern 200. The second portions 302 of the sensing electrode pattern 300 may extend from the first portions 301 of the sensing electrode pattern 300 in the direction parallel to the second direction D2 and the direction opposite to the second direction D2. The sensing electrode pattern 300 may be spaced a predetermined distance while surrounding the driving electrode pattern 200. In other words, the sensing electrode pattern 300 may be provided between the first to fourth portions 201 to 204 of the driving electrode pattern 200 while being spaced apart from the same. A portion of the first portions 301 of the sensing electrode pattern 300 may be electrically connected to the sensing lines 310 at the upper and lower edges of the touch cell 10.

Referring to FIG. 5, the driving electrode pattern 200 and the sensing electrode pattern 300 may be provided on the basis of a design method according to another embodiment of the inventive concept. The driving electrode pattern 200 may include first portions 201 extending in the first direction D1 and second portions 202 extending in the second direction D2. The first portions 201 of the driving electrode pattern 200 may be spaced a predetermined distance from each other. The first portions 201 of the driving electrode pattern 200 may have different lengths from each other. The second portions 202 of the driving electrode pattern 200 may extend in the second direction D2 from one end point of the first portions 201 of the driving electrode pattern 200 until the other end point of the first portions 201 of the driving electrode pattern 200. The first portions 201 and the second portions 202 of the driving electrode pattern 200 may be connected to each other to have a vortex shape as in FIG. 5. The second portions 202 of the driving electrode pattern 200 may be electrically connected to any one of the driving lines 210 at the left or right edge.

The sensing electrode pattern 300 may include first portions 301 extending in the first direction D1 and second portions 302 extending in the second direction D2. The first portions 301 and the second portions 302 of the sensing electrode pattern 300 may have as shape that is substantially the same as or similar to the first portions 201 and the second portions 202 of the driving electrode pattern 200. That is, the first portions 301 and the second portions 302 of the sensing electrode pattern 300 may be connected to each other to have a vortex shape as in FIG. 5. The sensing electrode pattern 300 may surround the driving electrode pattern 200 while being spaced a predetermined distance from the same. The first portions 301 of the sensing electrode pattern 300 may be spaced apart from the first portions 201 of the driving electrode pattern 200. The second portions 302 of the sensing electrode pattern 300 may be spaced apart from the second portions 202 of the driving electrode pattern 200. A portion of the first portions 301 of the sensing electrode pattern 300 may be electrically connected to the sensing lines 310 at the upper and lower edges of the touch cell 10.

As illustrated in FIGS. 3 to 5, as the driving electrode pattern 200 and the sensing electrode pattern 300 are designed in various methods, and the sensing electrode pattern 300 surrounds the driving electrode pattern 200 while being spaced a predetermined distance from the same, a parasitic capacitance in the touch cell 10 may be maximized.

Figure 6:
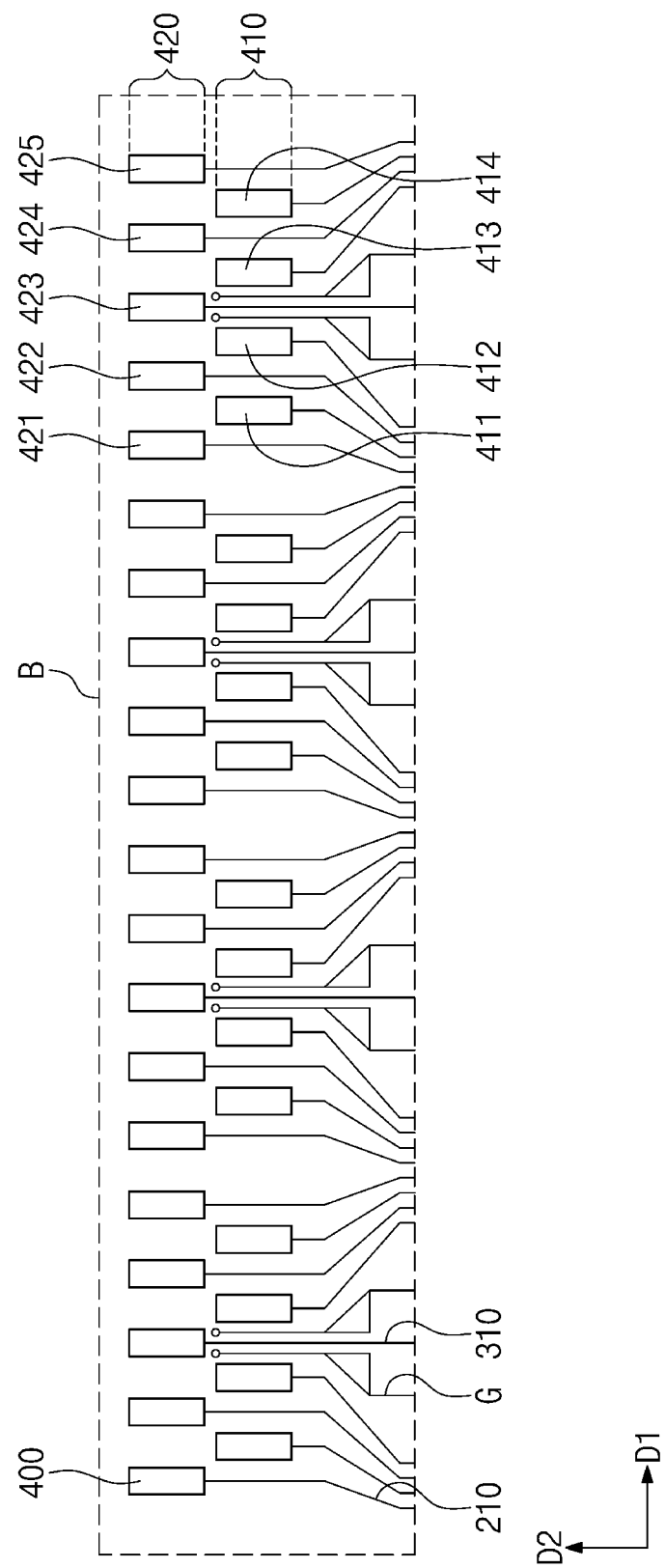
FIG. 6 is a plan view illustrating bonding pads according to embodiments of the inventive concept and enlarging a portion B of one of FIGS. 1A and 2A.

FIG. 6 is a plan view illustrating bonding pads according to embodiments of the inventive concept and enlarging a portion B of one of FIGS. 1A and 2A.

Referring to FIG. 6, the touch screen panel may include a plurality of bonding pads 400. The bonding pads 400 may be provided in the bezel area B. The bonding pads 400 may be electrically connected to the driving lines 210 and the sensing lines 310 in the bezel area B. Also, the bonding pads 400 may be electrically connected to a flexible printed circuit board (FPCB) in the bezel area B.

Each of the bonding pads 400 may have a first directional width of about 100 μm to about 600 μm. Each of the bonding pads 400 may have a second directional length of about 100 μm to about 2000 μm. The bonding pads 400 may be divided into two rows. However, this is merely an example, and the embodiment of the inventive concept is not limited thereto. For example, as the number of each of the driving lines 210 and the sensing lines 310 increases, the bonding pads 400 may be divided into three or more rows. The bonding pads 400 may be provided in a first row 410 and a second row 420. The first row 410 and the second row 420 may be spaced apart from each other in the second direction D2. The bonding pads 411 to 414 in the first row 410 may be spaced apart from each other in the first direction D1. The bonding pads 421 to 425 in the second row 420 may be spaced apart from each other in the first direction D1. The bonding pads 411 to 414 in the first row 410 and the bonding pads 421 to 425 in the second row 420 may be misaligned with each other. That is, although the bonding pads 411 to 414 in the first row 410 extend in the second direction D2, the bonding pads 411 to 414 in the first row 410 may not overlap or meet the bonding pads 421 to 425 in the second row 420. As the bonding pads 400 are divided into the two rows, a space, in which the bonding pads 400 are disposed, may be sufficiently secured. That is, each of the bonding pads 400 may have an increased first directional width in comparison with a case when the bonding pads 400 are arranged in one row.

Also, ground lines G may be provided between the driving lines 210 and the sensing lines 310. The ground lines G may be connected to a ground potential or another reference potential. As the ground lines G are provided, electrical separation between the driving lines 210 and the sensing lines 310 may be reinforced, and thus noises may be removed.

Figure 7:
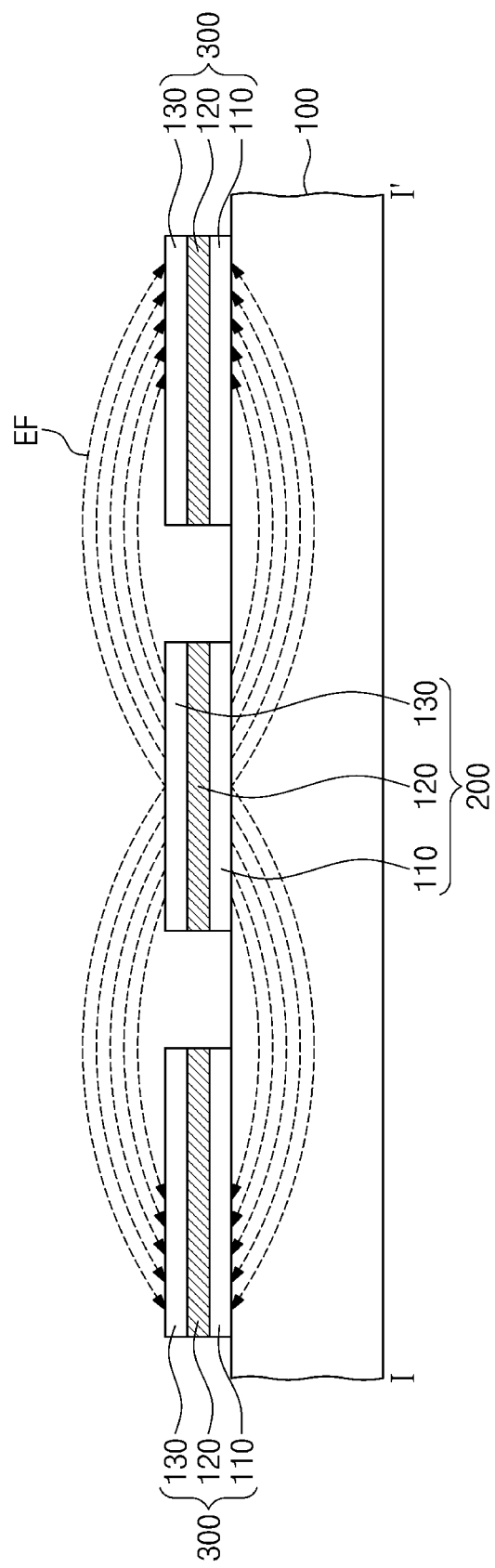
FIGS. 7 and 8 are cross-sectional views illustrating an operation principle of the touch screen panel according to an embodiment of the inventive concept and corresponding to a cross-section taken along line I-I' of FIGS. 3 to 5.
Figure 8:
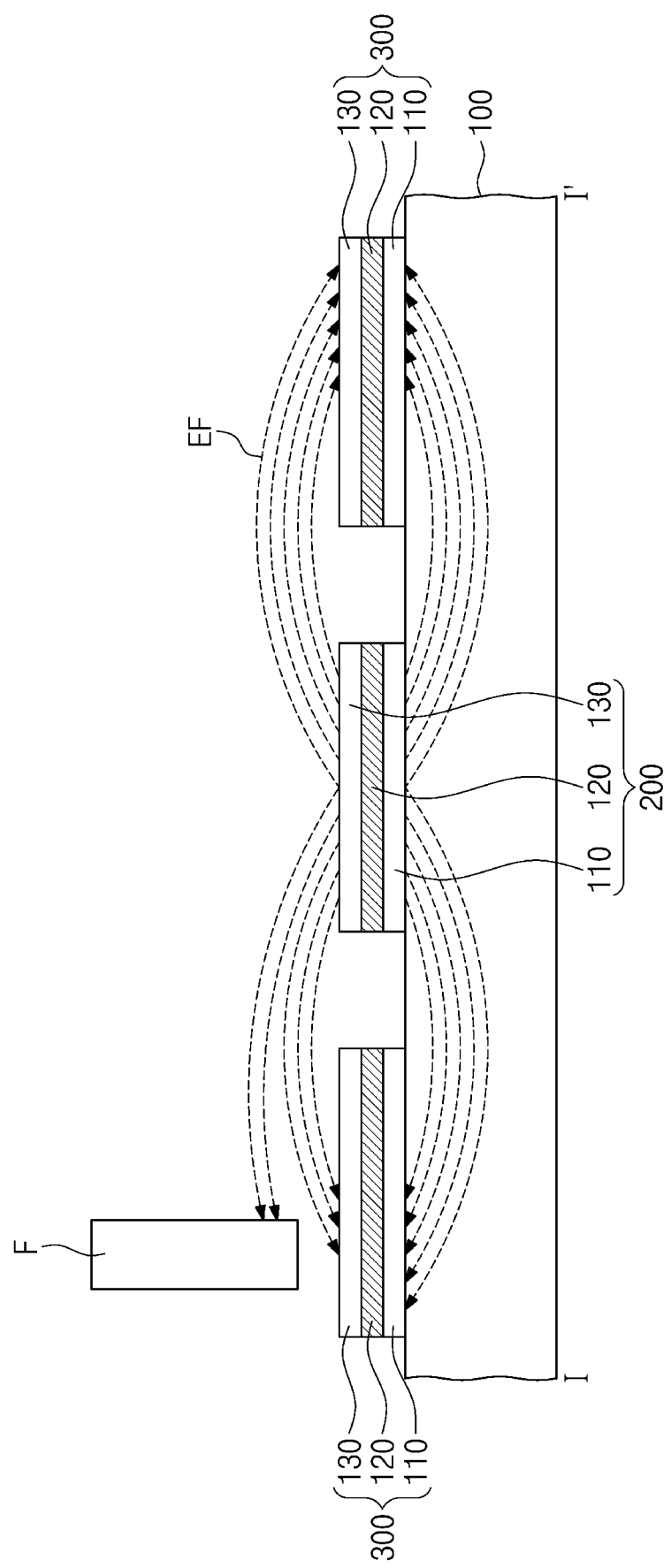

FIGS. 7 and 8 are cross-sectional views illustrating an operation principle of a touch screen panel according to an embodiment of the inventive concept and corresponding to a cross-section taken along line I-I' of one of FIGS. 3 to 5.

Referring to FIGS. 7 and 8, a touch screen panel according to an embodiment of the inventive concept may include a substrate 100 and a driving electrode pattern 200 and a sensing electrode pattern 300, which are provided on the substrate 100. The substrate 100 may be made of, e.g., tempered glass that is chemically strengthened, reinforced plastic, or polyethylene terphthalate (PET). Each of the driving electrode pattern 200 and the sensing electrode pattern 300 may be provided as a hybrid electrode. That is, each of the driving electrode pattern 200 and the sensing electrode pattern 300 may include a lower oxide layer 110, an intermediate metal layer 120, and an upper oxide layer 130. The lower oxide layer 110 may have a thickness of, e.g., about 20 nm to about 60 nm. For example, the lower oxide layer 110 may be made of at least one selected from the group consisting of ZnO, ZITO($ZnO+In_2O_3+SnO2$), $SiO_2$, ZTO, $TiO_2$, AZO(Al-doped ZnO), GZO(Ga-doped ZnO), SiNx, ITO, IZO($In_2O_3+ZnO$), and a compound thereof. The intermediate metal layer 120 may have a thickness of, e.g., about 5 nm to about 20 nm. For example, the intermediate metal layer 120 may be made of Ag or an Ag alloy. The Ag alloy may include binary and ternary metal such as Ag—Al, Ag—Mo, Ag—Au, Ag—Pd, Ag—Ti, Ag—Cu, Ag—Au—Pd, and Ag—Au—Cu. The upper oxide layer 130 may have a thickness of, e.g., about 20 nm to about 60 nm. For example, the upper oxide layer 130 may be made of at least one of TIO, IZTO, IZO, AZO, and GZO The lower oxide layer 110, the intermediate metal layer 120, and the upper oxide layer 130 may be sequentially deposited on the substrate 100, and then the driving electrode pattern 200 and the sensing electrode pattern 300 may be provided through a patterning process. Through the patterning process, the driving electrode pattern 200 and the sensing electrode pattern 300 may be spaced apart from each other. The patterning process may be performed through one of a photo-resist process, a wet etching process, and a dry etching process. An etched area through the patterning process may have a width of about 10 μm to about 40 μm.

When a voltage is applied to the driving electrode pattern 200, an electric field EF heading from the driving electrode pattern 200 to the sensing electrode pattern 300 may be provided. According to an intensity of the electric field EF, a value of a mutual capacitance between the driving electrode pattern 200 and the sensing electrode pattern 300 may be determined. As in FIG. 8, when a conductive bar F approaches and applies a touch input, the electric field EF emitted from the driving electrode pattern 200 may be partially blocked. When a portion of the electric field EF is blocked, the value of the mutual capacitance between the driving electrode pattern 200 and the sensing electrode pattern 300 may be varied. Through the variation of the value of the mutual capacitance, the touch screen panel may recognize a touch. The substantially same result may be obtained by using a screen touch pen or a finger instead of the conductive bar F.

Figure 9:
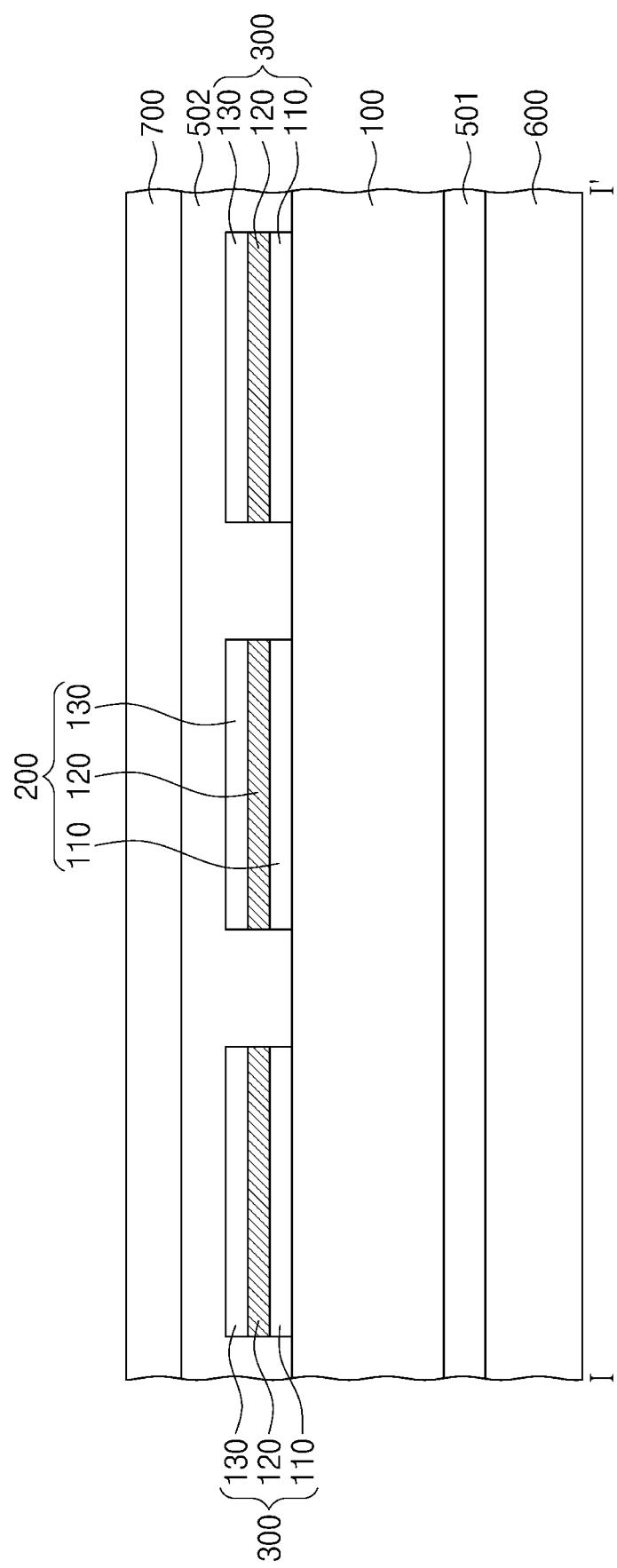
FIG. 9 is a cross-sectional view illustrating a touch screen panel according to an embodiment of the inventive concept and corresponding to a cross-section taken along line I-I' of one of FIGS. 3 to 5.

FIG. 9 is a cross-sectional view illustrating a touch screen panel according to an embodiment of the inventive concept and corresponding to a cross-section taken along line I-I' of one of FIGS. 3 to 5.

Referring to FIG. 9, the touch screen panel may further include a window 600 and a display panel 700 in addition to those described with reference to FIGS. 7 and 8. Here, the window 600 may be made of, e.g., tempered glass that is chemically strengthened, reinforced plastic, or polyethylene terphthalate (PET). The window 600 may be attached to a bottom surface of the substrate 100 through a first optical adhesive layer 501. The display panel 700 may be attached on the substrate 100, the driving electrode pattern 200, and the sensing electrode pattern 300 through a second optical adhesive layer 502 disposed on the substrate 100 while covering the driving electrode pattern 200 and the sensing electrode pattern 300. Each of the first and second optical adhesive layers 501 and 502 may be made of an optically clear adhesive (OCA) or an optically clear resin (OCR).

The touch screen panel according to an embodiment of the inventive concept may secure the visibility and the high transmittance and reduce the manufacturing costs by using the hybrid electrode.

Also, the embodiment of the inventive concept may maximize the parasitic capacitance of the touch screen panel through the method for designing the touch cell.

Also, the embodiment of the inventive concept provides the touch screen panel having the large area through the method for designing the bonding pad.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Thus, the above-disclosed embodiments are to be considered illustrative and not restrictive.

What is claimed is:

1. A touch screen panel comprising:
   a substrate;
   touch cells comprising a driving electrode pattern and a sensing electrode pattern, the touch cells being disposed on the substrate;
   driving lines and sensing lines connected to the touch cells; and
   bonding pads connected to the driving lines and the sensing lines,
   wherein the driving electrode pattern and the sensing electrode pattern are provided by stacking a lower oxide layer, an intermediate metal layer, and an upper oxide layer,
   wherein the sensing electrode pattern surrounds the driving electrode pattern while being spaced apart from the driving electrode pattern,
   wherein a top surface of the upper oxide layer of the driving electrode pattern is located at a same level with a top surface of the upper oxide layer of the sensing electrode pattern, and
   wherein a bottom surface of the lower oxide layer of the driving electrode pattern is located at a same level with a bottom surface of the lower oxide layer of the sensing electrode pattern.

2. The touch screen panel of claim 1, wherein each of the driving electrode pattern and the sensing electrode pattern comprises portions extending in a first direction and portions extending in a second direction perpendicular to the first direction.

3. The touch screen panel of claim 2, wherein each of the touch cells has a rectangular shape, and the sensing electrode pattern includes an outer portion that extends continuously along three sides of the rectangular shape to surround the driving electrode pattern, and on a fourth side of the rectangular shape, the outer portion of the sensing electrode pattern has an opening through which passes a portion of one of the driving lines.

4. The touch screen panel of claim 1, wherein the driving electrode pattern comprises:
   a first portion being provided at a center of each of the touch cells and extending in the first direction; and
   second portions extending from the first portion in a direction parallel to the second direction and a direction opposite to the second direction.

5. The touch screen panel of claim 1, wherein the driving electrode pattern comprises:

a first portion being provided at a center of each of the touch cells and extending in the first direction;

second portions extending from the first portion in a direction parallel to the second direction and a direction opposite to the second direction;

third portions extending in the direction parallel to the second direction and the direction opposite to the second direction while being spaced apart from the first portion; and fourth portions configured to connect the second portions and the third portions and extending in the first direction.

6. The touch screen panel of claim 1, wherein the driving electrode pattern comprises:

first portions extending in the first direction; and second portions extending in the second direction, wherein the first portions and the second portions are repeatedly provided to have a vortex shape.

7. The touch screen panel of claim 1, wherein the touch cells are arranged in a matrix form, a half of the touch cells, which corresponds to one row, are connected to the driving lines at a left side thereof, and a half of the touch cells, which corresponds to one row, are connected to the driving lines at a right side thereof.

8. The touch screen panel of claim 1, wherein the touch cells are arranged in a matrix form, and the touch cells corresponding to one row are connected to the driving lines alternately at left and right sides thereof.

9. The touch screen panel of claim 1, wherein a bezel area is defined at an edge of a matrix form of the touch cells, and the driving lines and the sensing lines are connected to the bonding pads in the bezel area.

10. The touch screen panel of claim 9, further comprising ground lines disposed between the driving lines and the sensing lines in the bezel area.

11. The touch screen panel of claim 9, wherein the bonding pads are divided into two rows in a misaligned manner in the bezel area.

12. The touch screen panel of claim 1, wherein the substrate is made of at least one of tempered glass, reinforced plastic, and polyethylene terphthalate (PET).

13. The touch screen panel of claim 1, wherein the lower oxide layer is made of at least one selected from the group consisting of ZnO, ZITO(ZnO+$In_2O_3$+$SnO_2$), $SiO_2$, ZTO, TiO2, AZO(Al-doped ZnO), GZO(Ga-doped ZnO), SiNx, ITO, IZO($In_2O_3$+ZnO), and a compound of at least two of ZnO, ZITO(ZnO+$In_2O_3$+$SnO_2$), $SiO_2$, ZTO, TiO2, AZO (Al-doped ZnO), GZO(Ga-doped ZnO), SiNx, ITO or IZO ($In_2O_3$+ZnO), the intermediate metal layer is made of Ag or a Ag alloy, and the upper oxide layer is made of at least one of TIO, IZTO, IZO, AZO, and GZO.

14. The touch screen panel of claim 1, further comprising:

a window provided on a bottom surface of the substrate through a first optical adhesive layer; and a display panel provided on the substrate and the touch cells through a second optical adhesive layer, wherein the second optical adhesive layer is disposed between the display panel and the upper oxide layer of each of the driving electrode pattern and the sensing electrode pattern, and wherein the second optical adhesive layer entirely covers the top surface of the upper oxide layer of the driving electrode pattern and the top surface of the upper oxide layer of the sensing electrode pattern.

15. The touch screen panel of claim 14, wherein the window is made of at least one of tempered glass, reinforced plastic, and polyethylene terphthalate (PET).

\* \* \* \* \*